Feb. 23, 1971     L. E. RETHWISCH     3,564,867

CONSTANT VELOCITY UNIVERSAL JOINT

Filed May 15, 1969     2 Sheets-Sheet 1

*INVENTOR.*
LLOYD E. RETHWISCH
BY
*Hinderstein & Silber*
ATTORNEYS

Feb. 23, 1971   L. E. RETHWISCH   3,564,867
CONSTANT VELOCITY UNIVERSAL JOINT
Filed May 15, 1969   2 Sheets-Sheet 2
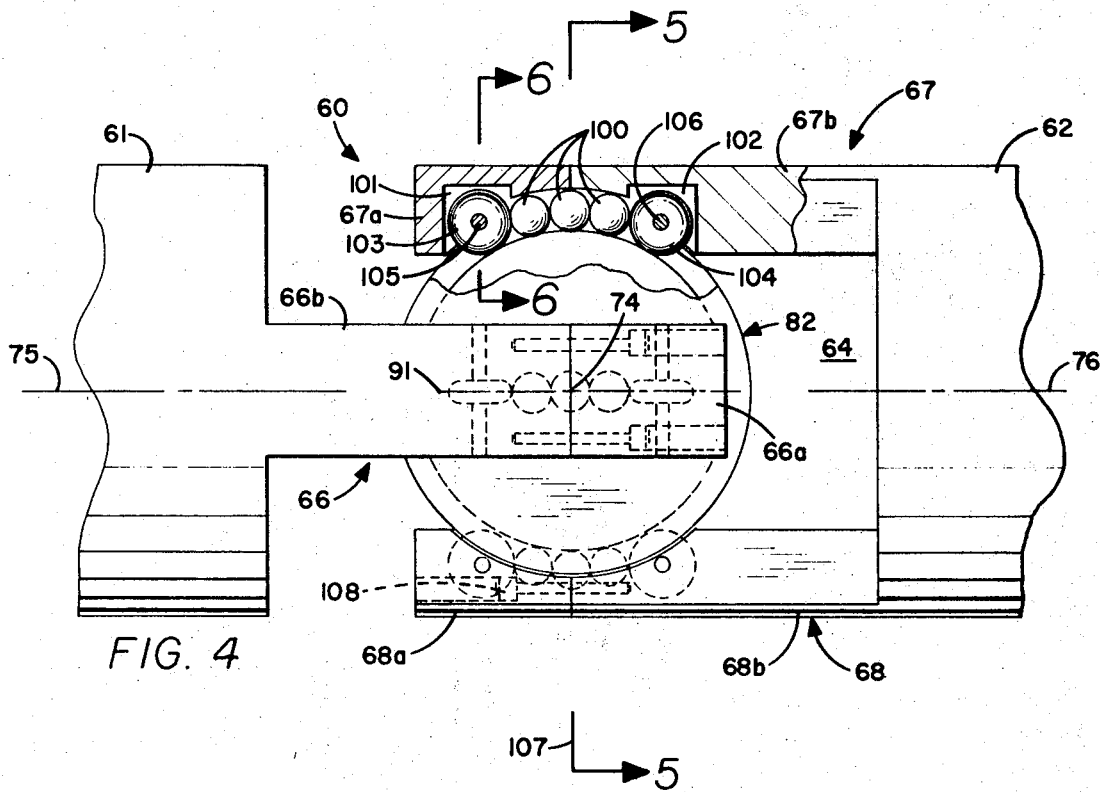
FIG. 4
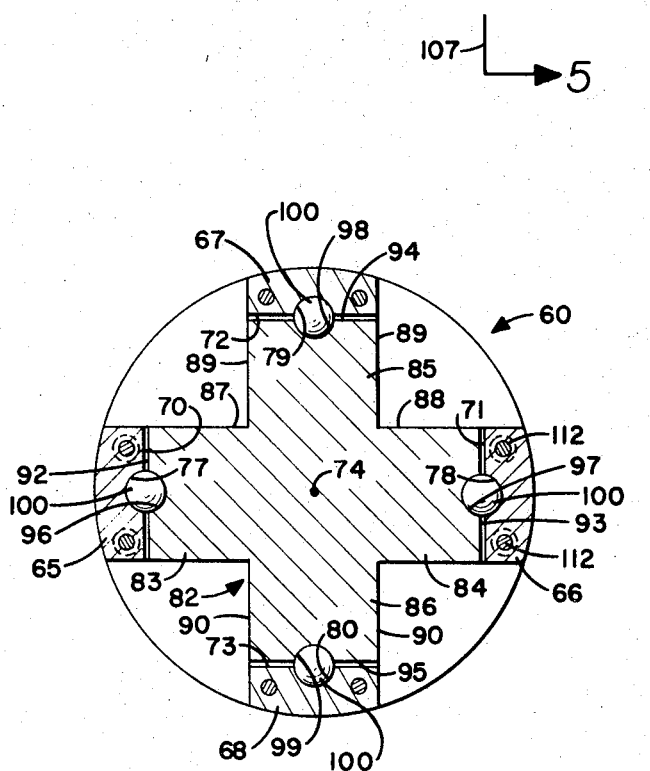
FIG. 5
FIG. 6
INVENTOR.
LLOYD E. RETHWISCH
BY
*Hinderston & Silber*
ATTORNEYS

United States Patent Office 3,564,867
Patented Feb. 23, 1971

3,564,867
CONSTANT VELOCITY UNIVERSAL JOINT
Lloyd E. Rethwisch, 3127 W. Graciosa Lane,
Anaheim, Calif. 92804
Filed May 15, 1969, Ser. No. 824,888
Int. Cl. F16d 3/30
U.S. Cl. 64—21
1 Claim

ABSTRACT OF THE DISCLOSURE

A constant velocity universal joint for transmitting rotation from one shaft to another comprising a centering member having two pairs of opposing shoes having arcuate end walls. Each shaft is provided with a yoke having opposing arcuate interior surfaces, the centering member being positioned with the end walls of one pair of shoes facing the interior surfaces of one yoke and with the end walls of the other pair of shoes facing the interior surfaces of the other yoke. According to one embodiment of the invention, each yoke has opposing interior walls having a slot therein, the bottom walls of the slots forming the arcuate interior surfaces, the shoes extending into the slots. According to another embodiment of the invention, each of the shoes has an arcuate raceway formed in the arcuate end wall thereof, each of the yokes has an arcuate raceway formed in each arcuate interior surface thereof, and a plurality of balls are positioned between the raceways in the shoes and the raceways in the yokes.

BACKGROUND OF THE INVENTION

(1) Field of the invention

The present invention relates to constant velocity universal joints and, more particularly, to a constant velocity universal joint characterized by a simplicity in construction, an ability to accept large angular displacements between input and output shafts, long life, and a high torque capacity.

(2) Description of the prior art

Universal-type joints between two rotatable shafts have been known and used for many years. Such joints are operative to transmit rotation from one shaft to the other regardless of various types of misalignment between the shafts.

Many different configurations for such universal-type joints have been suggested and are presently in use. In fact, so many different types of universal joints are presently available that a discussion of any number of them is impractical. Suffice it to say that essentially all existing universal joints suffer from at least one, and usually more, of a large number of problems. For example, one of the most common problems with prior art universal joints is their inability to transmit rotary motion from one shaft to another with a constant velocity. Another common problem is that many joints are not truly universal, i.e. each joint is only capable of accepting shaft misalignment in a single plane. As a result, two such joints are often required.

In order to achieve a constant velocity joint which is truly universal it has often been necessary to resort to elaborate mechanical configurations or to rely upon resilient and/or flexible materials to transmit rotation between two shafts. In the former case, the result is achieved by sacrificing simplicity thereby creating manufacturing difficulties and high costs. In the latter case, the result is a joint having a relatively low torque capacity and a relatively short life. The life span of other types of joints is also often limited due to relatively high friction levels therein.

Another problem common to many types of universal joints is their inability to accept large angular displacements between the input and output shafts such that the uses for such joints is limited.

SUMMARY OF THE INVENTION

According to the present invention, these and other problems of the prior art are solved by providing a constant velocity universal joint which is both simple in structure and easily manufactured so that it may be provided at a relatively low cost. The present joint has a relatively large torque capacity and, according to one embodiment, is essentially frictionless resulting in a relatively long life. Finally, the present constant velocity universal joint is capable of accepting large angular displacements between the rotating shafts it joins.

Briefly, the present invention consists of a centering member having two pairs of opposing shoes having arcuate end walls. Each shaft is provided with a yoke which straddles one pair of the opposing shoes. According to a first embodiment of the invention, the yokes include slots having arcuate interior walls. The shoes of the centering member are adapted to extend into the slots in the yokes with the arcuate end walls of the shoes mating with the arcuate interior walls of the slots. Each yoke is adapted to be separated along a line extending through the center of the centering member for the purpose of inserting the centering member between the slots and locking it therein.

According to a second embodiment of the present invention, the slots in the yokes are replaced by a plurality of rotating balls to provide an essentially frictionless joint between the centering member and the yokes.

It is, therefore, an object of the present invention to provide a novel constant velocity universal joint.

It is a further object of the present invention to provide a constant velocity universal joint which is simple in mechanical detail and easily manufactured.

It is a still further object of the present invention to provide a constant velocity universal joint which has a relatively large torque capacity.

It is another object of the present invention to provide a constant velocity universal joint which has a relatively small amount of friction and a relatively long life.

It is still another object of the present invention to provide a constant velocity universal joint which is capable of operating in the presence of large angular displacements between the input and output shafts.

Another object of the present invention is the provision of a constant velocity universal joint which permits the opposing shafts to be locked to the joint.

Still other objects, features and attendant advantages of the present invention will become apparent to those skilled in the art from a reading of the following detailed description of the prefered embodiments constructed in accordance therewith, taken in conjunction with the accompanying drawings wherein like numerals designate like parts in the several figures and wherein:

BRIEF DESCRIPTION OF THE DRAWINGS

FIG. 4 is a front elevation view, partly in section, of a second embodiment of constant velocity universal joint constructed in accordance with the teachings of the present invention;

FIG. 5 is a sectional view taken along the line 5—5 in FIG. 4; and

FIG. 6 is a sectional view taken along the line 6—6 in FIG. 4.

DESCRIPTION OF THE PREFERRED EMBODIMENTS

Figure 1:
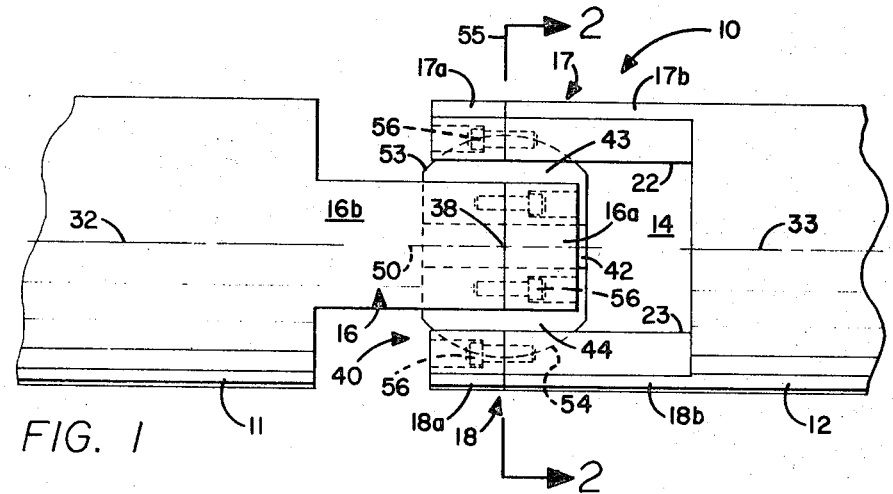
FIG. 1 is a front elevation view of a first embodiment of a constant velocity universal joint constructed in accordance with the teachings of the present invention.
Figure 2:
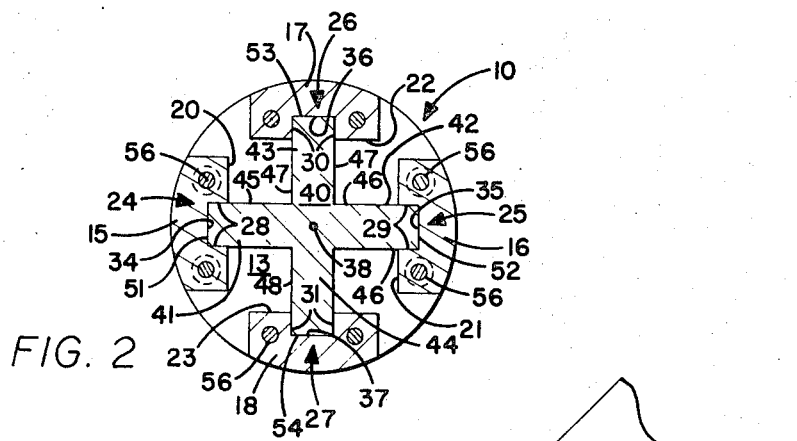
FIG. 2 is a sectional view taken along the line 2—2 in FIG. 1.
Figure 3:
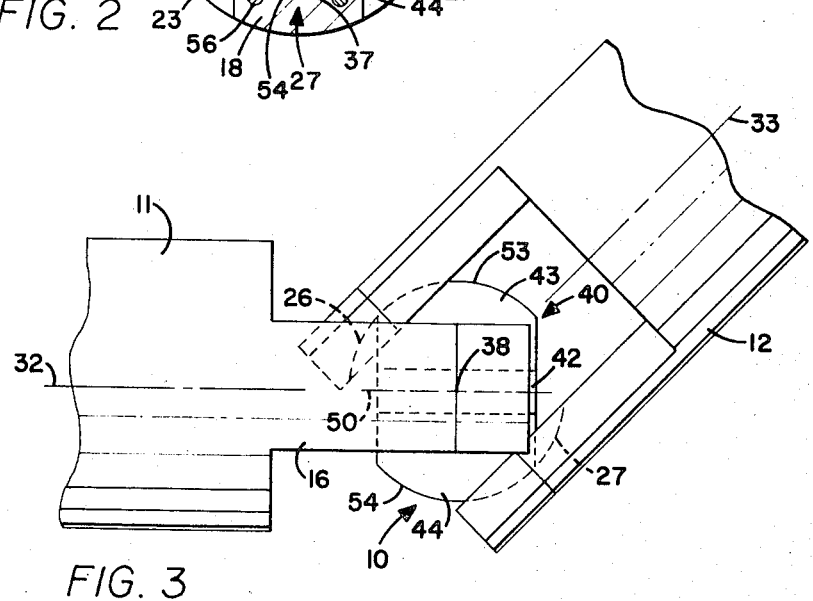
FIG. 3 is a front elevation view of the joint of FIG. 1 showing its operation in the presence of an angular displacement between the input and output shafts.

Referring now to the drawings and, more particularly, to FIGS. 1–3 thereof, there is illustrated a first embodiment 10 of a constant velocity universal joint constructed in accordance with the teachings of the present invention. Joint 10 is adapted to transmit, with a constant velocity, the rotation of a first shaft 11 to a second shaft 12 or vice versa. For this purpose, shaft 11 is provided with a socket 13 thereby forming a yoke consisting of first and second sections 15 and 16. Similarly, shaft 12 is provided with a socket 14 thereby forming a yoke consisting of first and second sections 17 and 18.

Yoke sections 15–18 have interior walls 20, 21, 22 and 23, respectively, which are provided with a plurality of interior slots 24, 25, 26 and 27, respectively. Slots 24–27 are preferably formed so that they are all identical. In addition, slots 24–27 are spaced equidistantly from one another around joint 10. Slots 24 and 25 have parallel side walls 28 and 29, respectively, which extend in a direction parallel to the longitudinal axis 32 of shaft 11. Similarly, slots 26 and 27 have parallel side walls 30 and 31, respectively, which extend in a direction parallel to the longitudinal axis 33 of shaft 12.

Slots 24–27 also have arcuate bottom walls 34–37, respectively. All of bottom walls 34–37 are cylindrical in shape and extend about the same center of curvature 38 at the point of intersection of axes 32 and 33 of shafts 11 and 12, respectively.

Positioned within sockets 13 and 14 is located what is referred to herein as a centering member 40. Centering member 40 consists of a plurality of shoes 41, 42, 43 and 44 which correspond to and are adopted to cooperate with slots 24–27, respectively. More specifically, shoes 41–44 include flat, parallel side walls 45, 46, 47 and 48, respectively, which are all aligned parallel to the longitudinal axis 50 of centering member 40. In addition, side walls 45–48 are adapted to fit between and slide along side walls 28–31, respectively, of slots 24–27, respectively. Also, shoes 41–44 include arcuate end walls 51, 52, 53 and 54 having the same configuration and center of curvature 38 as bottom walls 34–37, respectively, of slots 24–27, respectively, so that end walls 51–54 fit against and slide along bottom walls 34–37, respectively.

As seen most clearly in FIG. 1, shoes 41–44 of centering member 40 are locked between opposing yoke sections 15, 16 and 17, 18 of shafts 11 and 12, respectively, so that shafts 11 and 12 are secured to centering member 40. To achieve this, yoke sections 15–18 are split into two portions 15A and 15B, 16A and 16B, 17A and 17B, and 18A and 18B, respectively, along a plane 55 passing through the center of curvature 38 of centering member 40, perpendicular to axes 32 and 33. After shoes 41–44 are positioned within slots 24–27, respectively, portions 15A and 15B, 16A and 16B, 17A and 17B, and 18A and 18B, respectively, are secured together by means of screws 56.

Once assembled, joint 10 will transmit rotation between shafts 11 and 12 even if there is a significant misalignment as indicated in FIG. 3 of the drawings. More specifically, each of shafts 11 and 12 may be angularly displaced by rotation around center of curvature 38, shoes 41–44 operating as guides for shafts 11 and 12. An important feature of coupling 10 is the fact that rotation is transferred between shafts 11 and 12 at a constant angular velocity due to the positive contact between side walls 45–48 of shoes 41–44, respectively, and side walls 28–31 of slots 24–27, respectively.

Other advantages to be derived from joint 10 will be immediately apparent. More specifically, due to the simplicity of joint 10, it is easily manufactured and produced at a relatively low cost. Furthermore, due to the large area of contact between side walls 28–31 and side walls 45–48, respectively, joint 10 has a relatively large torque capacity. Furthermore, and as shown in FIG. 3, joint 10 is capable of accommodating a relatively large angular displacement between shafts 11 and 12.

With reference to FIG. 3, it will be apparent that with shafts 11 and 12 in the position shown, axis 50 of centering member 40 will be aligned with axis 32 of shaft 11. As shafts 11 and 12 rotate through an angle of 90°, centering member 40 also rotates about axis 50 through an angle of 90°. However, simultaneously with the rotation of centering member 40 about axis 50, axis 50 rotates about an axis which is perpendicular to axis 50 and passes through center of curvature 38 so that after 90° of rotation of shafts 11 and 12, axis 50 of centering member 40 is aligned with axis 33 of shaft 12. As shafts 11 and 12 rotate through an additional 90°, centering member 40 rotates around axis 50 through an angle of 90° and axis 50 pivots back into alignment with axis 32 of shaft 11. This pivoting motion of centering member 40 might result in an unacceptable amount of friction between shoes 41–44 and slots 24–27, respectively, in the absence of additional means for eliminating such friction. One such means is to enclose joint 10 in a flexible seal and fill the entire joint with a suitable lubricant. However, in cases where this is not posible, the same effect may be achieved in accordance with the second embodiment of the present invention.

Referring now to FIGS. 4–6, there is illustrated a second embodiment 60 of a constant velocity universal joint constructed in accordance with the teachings of the present invention. Joint 60 is adapted to transmit, with a constant velocity, the rotation of a first shaft 61 to a second shaf 62 and vice versa. For this purpose, shaft 61 is provided with a socket 63 thereby forming a yoke consisting of first and second sections 65 and 66. Similarly, shaft 62 is provided with a socket 64 thereby forming a yoke consisting of first and second sections 67 and 68.

Yoke sections 65–68 have arcuate interior walls 70, 71, 72 and 73, respectively, which are cylindrical in shape and extend around the center of curvature 74 at the point of intersection of axes 75 and 76 of shafts 61 and 62, respectively. In addition, interior walls 70–73 are provided with arcuate raceways 77, 78, 79 and 80, respectively.

Positioned within sockets 63 and 64 is located what is referred to herein as a centering member 82. Centering member 82 consists of a plurality of shoes 83, 84, 85 and 86 which corresponds to and are adapted to cooperate with yoke sections 65–68, respectively. More specifically, shoes 83–86 include flat, parallel sidewalls 87, 88, 89 and 90, respectively, which are aligned parallel to the longitudinal axis 91 of centering member 82. Shoes 83–86 also include arcuate end walls 92, 93, 94 and 95, respectively, having the same configuration and center of curvature 74 as interior walls 70–73 of yoke sections 65–68, respectively. End walls 92–95 are provided with arcuate raceways 96, 97, 98 and 99, raceways 96–99 being positioned opposite and facing raceways 77–80, respectively, in yoke sections 65–68, respectively. A plurality of balls 100 are adapted to be positioned between raceways 77–80 and 96–99, respectively, so that yoke sections 65–68 may readily reciprocate around centering member 82 along raceways 96–99 in shoes 83–86, respectively.

According to one embodiment of the present invention, a plurality of balls, such as three, may be positioned between each of raceways 77–80 and 96–99, respectively. In addition, and as shown in FIGS. 4 and 6, each of yoke sections 65–68 may be provided with a pair of slots 101 and 102 which extend outwardly from raceways 77–80 and are positioned perpendicular to the longitudinal axes 75 and 76 of the respective shafts. Slots 101 and 102 are adapted to receive a pair of rollers 103 and 104, respectively, which are secured to yoke sections 65–68 by means of pins 105 and 106, respectively. Rollers 103 and 104 are operative to retain balls 100 between raceways 77–80 and 96–99 with a minimum of friction so that balls 100 may freely roll during motion of shafts 61 and 62.

Finally, shoes 83–86 of centering member 82 are locked between opposing yoke sections 65, 66 and 67, 68 of shafts 61 and 62, respectively, so that shafts 61 and 62 are secured to centering member 82 To achieve this, yoke sections 65–68 are split into two sections 65A and 65B, 66A and 66B, 67A and 67B, and 68A and 68B, respectively, along a plane 107 passing through the center of curvature 74 of centering member 82, perpendicular to axes 75 and 76. After shoes 83–86 are positioned within yoke sections 65–68, respectively, portions 65A and 65B, 66A and 66B, 67A and 67B and 68A and 68B, respectively, are secured together by means of screws 108.

Once assembled, joint 60 will transmit rotation between 61 and 62 in the same manner as previously described with respect to the embodiments of FIGS. 1–3. Furthermore, as centering member 82 pivots between the two angular positions defined by the axes of misaligned shafts 61 and 62, friction is prevented between shoes 83–86 and yoke sections 65–68, respectively, due to the action of balls 100 between raceways 96–99 and 77–80, respectively.

While the invention has been described with respect to several physical embodiments constructed in accordance therewith, it will be apparent to those skilled in the art that various modifications and improvements may be made without departing from the scope and spirit of the invention. More specifically, rollers 103 and 104 may be eliminated and replaced with a plurality of balls locked between raceways 77–80 and 96–99, respectively. In addition, whether rollers 103 and 104 are eliminated or not, it would be possible to make alternate balls with a smaller diameter than the remaining balls so as to minimize sliding friction between adjacent balls.

I claim:
1. A constant velocity universal joint comprising:
a centering member having first and second pairs of opposing shoes, said shoes being uniformly spaced around the longitudinal axis of said centering member, each of said shoes having an arcuate end wall, the end walls of all of said shoes having a common center of curvature along said longitudinal axis of said centering member, each of said shoes having an arcuate raceway formed in said arcuate end walls thereof;
first and second yokes, each of said yokes having opposed, arcuate interior surfaces, the interior surfaces of both of said yokes having a common center of curvature which is common to the center of curvature of said end walls of said shoes, each of said yokes having an arcuate raceway formed in each of said arcuate interior surfaces thereof, said centering member being positioned with the end walls of said first pair of shoes facing and aligned with the interior surfaces of said first yoke and with the end walls of said second pair of shoes facing and aligned with the interior surfaces of said second yoke;
a plurality of balls positioned between each of said raceways in said shoes and each of said raceways in said yokes; and
a pair of rollers positioned between each of said raceways in said shoes and each of said raceways in said yokes, said plurality of balls being positioned between said rollers.

References Cited

UNITED STATES PATENTS

| | | | |
|---|---|---|---|
| 1,836,095 | 12/1931 | Van Ranst | 64—16 |
| 2,641,115 | 6/1953 | Garrison | 64—16 |
| 2,724,624 | 11/1955 | Barr | 308—200 |

FRED C. MATTERN, Jr., Primary Examiner

R. HEALD, Assistant Examiner